Nov. 17, 1936.     B. D. SMITH     2,060,904
APPARATUS FOR MEASURING THE MOMENTS OF BLADE SEGMENTS
Filed May 22, 1930
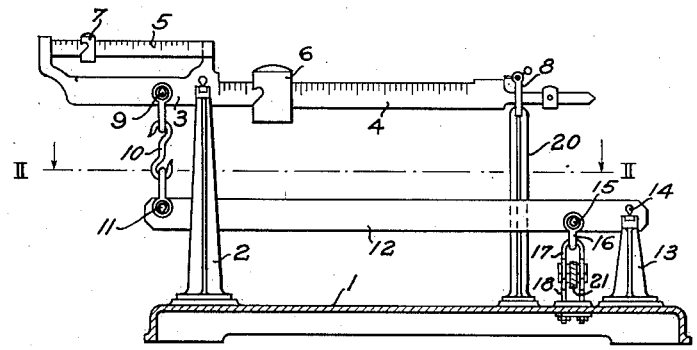
Fig. 1
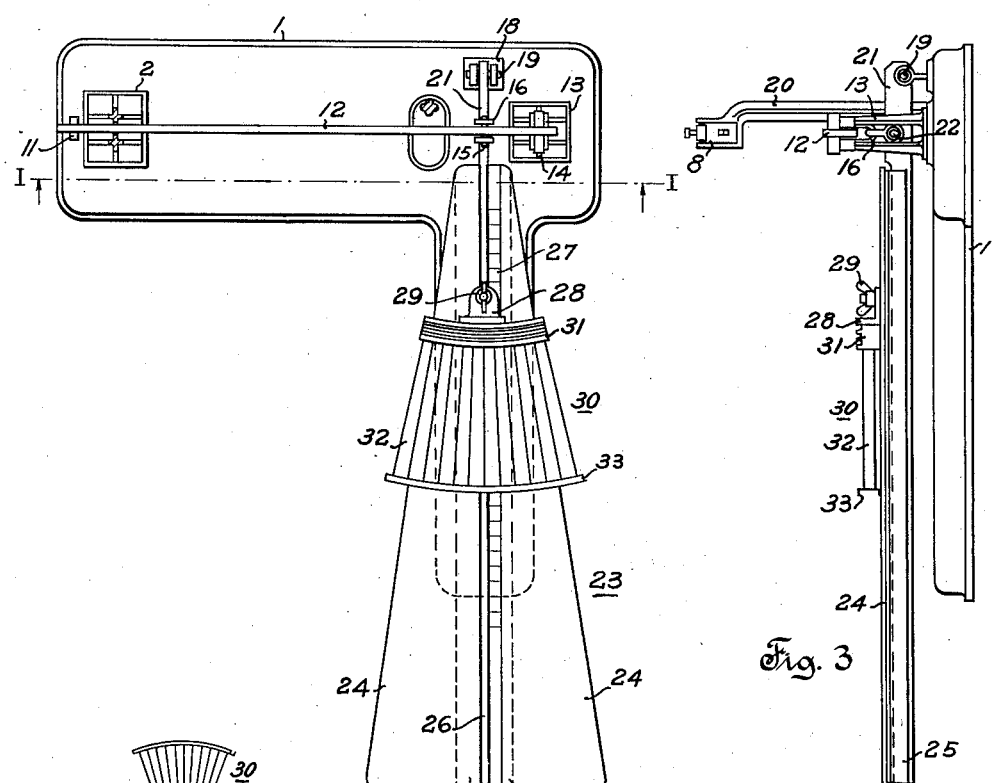
Fig. 2
Fig. 3
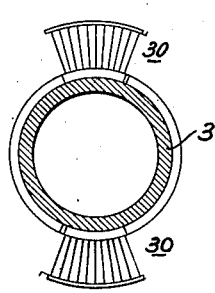
Fig. 4
Inventor
B. D. Smith
by
Attorney Patented Nov. 17, 1936

2,060,904

UNITED STATES PATENT OFFICE 2,060,904

APPARATUS FOR MEASURING THE MOMENTS OF BLADE SEGMENTS

Beecher D. Smith, West Allis, Wis., assignor to Allis-Chalmers Manufacturing Company, Milwaukee, Wis., a corporation of Delaware Application May 22, 1930, Serial No. 454,621

3 Claims. (Cl. 73—51)

This invention relates generally to an improved apparatus for constructing a dynamically and also statically balanced rotor which is formed of a plurality of blade segments or the like.

An object of the invention is to provide an improved apparatus for determining the moments of turbine blade segments or the like, whereby a dynamically and also statically balanced rotor may be produced.

Referring to the drawing:

Fig. 1 is a sectional elevation of the improved scale or apparatus for measuring the moments of blade segments, or the like, taken on line I—I of Fig. 2 looking in the direction of the arrows.

Fig. 2 is a sectional plan of the showing in Fig. 1 taken on the line II—II thereof.

Fig. 3 is a side elevation of the scale with a blade segment in moment determining position on the platform thereof.

Fig. 4 shows a pair of blade segments mounted in diametrically opposed relation on a rotary support 34.

In order to obtain a dynamically balanced rotor, consisting of a plurality of blade segments or the like, mounted on a rotary support, I have devised a new method and apparatus for assembling rotors. The method forms the subject-matter of my divisional application No. 62,124, filed February 3, 1936.

According to this invention the moments of the blade segments or the like, prior to assembling and mounting them on a rotary support, are individually measured on an improved scale which will later be described. The moments of the blade segments for a rotary support of a given diameter are all measured under the same conditions. The segment must be generally symmetrically positioned on the platform of the scale with reference to the vertical plane through the platform centerline. The segment is moreover positioned so that the distance from the center of the rotary support engaging surface of the blade segments, or the like, to the pivot or fulcrum of the platform is the same for each blade segment and equal to the radius of the surface of the rotary support with which the blade segments contact. The reading of the scale when a condition of balance has been obtained is the moment for that segment, which is recorded and so are also the readings of the other segments. The moments of the segments may be expressed in any arbitrary units such as inch units for simplicity and convenience in comparing them, since only relative moments need be determined according to this invention.

The next step in my improved method of balancing rotors is to select two blade segments that have the same value of moments and mount them in diametrically opposed relation on the rotary support as shown in Fig. 4.

Another pair of blade segments having like values of moments is selected and mounted in diametrically opposed relation on the rotary support. Pairs are thus selected and mounted on the rotary support until it has been filled and the rotor completed.

In order to effect a dynamically balanced rotor the centrifugal forces acting on the different masses constituting the rotor must have been considered. A body revolving in a curved path of radius R exerts a centrifugal force F, upon the arm or cord which restrains it from moving in a straight line, or "flying off at a tangent". If W equals the weight of the body, N equals the number of revolutions per minute, $g$ equals the acceleration due to gravity and $v$ equals the linear velocity of the center of gravity of the body then (1) $$v = \frac{2\pi R N}{60}$$

(2) $$F = \frac{W v^2}{g R}$$

Substituting the value of $v$ in (1) for $v$ of (2) I get $F = 0.00034084 \, W R N^2$.

From this equation it can be seen that the centrifugal force acting on each of the masses or segments of the rotor is proportional to weight times a certain distance, or a moment. Therefore by obtaining readings which are proportional to the moments of a plurality of blade segments, or the like, in the manner described above and then mounting the segments in pairs, each segment of a pair having the same moment, in diametrically opposed relation on a rotary support of radius R equal to the distance R at which the moments were determined, the centrifugal forces acting on the pair of segments will be equal and, considering that the pair of segments lie in a space bounded by transverse planes very close together, these forces will be substantially opposite and the rotor will therefore be practically dynamically and statically balanced. By continuing to fill in the periphery of the support in this manner with the members of each pair having like moments and mounted in diametrically opposed relation on the rotary support a substantially dynamically balanced complete rotor will be produced.

The improved scale or moment measuring apparatus already referred to will now be described in detail. The base 1 carries a standard 2 which forms the support for the beam 3, a knife-edge on the beam engaging the upper portion of the standard. The beam is provided with a major beam scale portion 4 and a minor beam scale portion 5 which carry major and minor traversing poise weights 6 and 7, respectively. A lever 12 is suspended from the beam 3 by means of links 10 which engage knife-edges 9 and 11 on the beam and lever, respectively. The opposite end of the lever 12 is provided with a knife-edge 14 which rests upon the upper portion of a support 13 carried by the base 1. A bar 21 positioned perpendicularly to the beam 3 and lever 12 is suspended from lever 12 by means of links 16 and 17 linked together and engaging with knife-edges 15 and 22 on the lever and bar, respectively. A knife-edge 19 on the bar 21 near one end thereof and near the knife-edge 22, engages with a standard 18 secured to base 1. Member 20 mounted on base 1 carries at its upper end a trip loop 8.

On the free end of the bar 21 a platform 23 is provided which extends to a point near the knife-edge 22 thereof. It will be observed from the drawing that the width of the bar 21 is reduced from a point near the knife-edge 22 to the free end of the bar. This construction permits a slot to be had in the platform, for purposes which will presently appear. Angle irons 25 are secured to the sides of bar 21 so as to have their upper surfaces approximately in the plane of the upper surface of the bar portion that is not reduced in width. Plates 24 are secured to angle irons 25 with their adjacent edges in spaced parallel relation.

On one of the plates 24 adjacent the slot 26 is inscribed a graduated scale 27 marked in inches as measured from the knife-edge 19. This scale ranges over limits sufficient to cover the minimum and maximum radial dimensions of the rotary supports which are to carry the weighed blade segments. To provide an adjustable means for locating the blade segments on the platform an indicator stop 28 of substantially L shape is provided with a bore to loosely receive a bolt having a square head, of about the size of the thickness of the bar 21, at one end, the threaded end of the bolt receiving a wing nut 29 and the head of the bolt is positioned in the slot 26.

The operation of the scale is as follows. The stop member 28 is first set at the scale division or reading which corresponds to the radial dimension of the support on which the blade segments are to be mounted. A blade segment 30 consisting of end shroud and foundation segments 33 and 31, respectively and connected blades 32 is then symmetrically positioned on the platform 23 with the mid-portion of the foundation segment 31 in contact with the stop member 28. The major and minor traversing poise weights 6 and 7 are now adjusted on major and minor beam scale portions 4 and 5 respectively, until the free end of the bar 21 stops oscillating and the beam 3 has its free end positioned in about the center of the trig loop 8. The reading of the two scale portions is then taken in arbitrarily chosen inch units and the value of the moment of this blade segment is represented by this reading.

It should be understood that it is not desired to limit invention to the exact details of construction and operation of the apparatus herein shown and described, for various modifications within the scope of the claims may occur to persons skilled in the art.

It is claimed and desired to secure by Letters Patent:

1. A scale for measuring moments of blade segments, or the like, comprising a scale frame, a lever, a beam at one end of the lever and pivotally connected thereto, a bar pivotally connected at one end to the scale frame, a substantially V-shaped platform symmetrically positioned on the opposite end of the bar, means for fulcruming the bar near its pivoted connection with the scale frame from the other end of the lever, said platform being provided with a longitudinal groove parallel to and overlying said bar, and a substantially L-shaped stop indicator provided with a square headed stud positioned in said slot for adjustably locating a segment on said platform.

2. A scale for use in predetermining the relative centrifugal effects of turbine blade segments when rotated about a predetermined axis, whereby segments may be matched to balance a turbine rotor, comprising a scale frame, a scale beam pivotally mounted on said scale frame, a lever pivotally connected at one end to said scale beam and pivotally mounted at its other end on said scale frame, a platform pivotally mounted at one end on said scale frame and pivotally connected near said pivotal mounting with said lever at a position near the pivotally mounted end thereof, and an adjustable stop member mounted on said platform for engaging the base of a turbine blade segment to position it relative to the pivot point of said platform in manner dynamically equivalent to its position relative to its predetermined axis of rotation in a turbine, whereby the relative centrifugal effect of said segment may be determined from the indication of said scale beam.

3. In a scale for use in matching turbine blade segments, the combination with a scale frame having a scale beam pivotally mounted thereon, of a blade-segment-receiving platform pivotally mounted at one end on said scale frame and operatively associated with said scale beam, said platform having a centrally disposed longitudinal slot and a graduated scale disposed adjacent to said slot, and a stop member slidably mounted in said slot and having adjusting means engaging said platform to position said stop in predetermined relation to the pivot axis of said platform as indicated by said graduated scale, whereby a turbine blade segment being tested may be positioned on said platform relative to the pivot axis thereof in manner equivalent to the position of said blade segment relative to its predetermined axis of rotation when mounted in a turbine rotor.

BEECHER D. SMITH.